United States Patent [19]
Rappaport

[11] Patent Number: 5,653,323
[45] Date of Patent: Aug. 5, 1997

[54] CLUTCH RELEASE BEARING ASSEMBLY

[75] Inventor: Claude Rappaport, Oklahoma City, Okla.

[73] Assignee: L & S Bearing Co., Oklahoma City, Okla.

[21] Appl. No.: 604,539

[22] Filed: Feb. 21, 1996

[51] Int. Cl.$^6$ ............................................. F16D 23/14
[52] U.S. Cl. ........................................... 192/98; 192/110 B
[58] Field of Search ............................ 192/98, 85 C, 192/110 B

[56] References Cited

U.S. PATENT DOCUMENTS

| | | | |
|---|---|---|---|
| 2,376,136 | 5/1945 | Gerst | 192/93 |
| 3,272,576 | 9/1966 | Greby | 308/233 |
| 3,433,341 | 3/1969 | Bohn et al. | 192/111 |
| 4,086,996 | 5/1978 | Gatewood | 192/111 A |
| 4,482,041 | 11/1984 | Ladin | 192/98 |
| 4,506,774 | 3/1985 | Block | 192/98 |
| 4,534,458 | 8/1985 | Ladin | 192/98 |
| 4,697,681 | 10/1987 | Gay et al. | 192/98 |
| 4,926,993 | 5/1990 | Kusumoto et al. | 192/98 |
| 5,119,919 | 6/1992 | Iga | 192/45 |
| 5,219,053 | 6/1993 | Castens | 192/45 |
| 5,228,845 | 7/1993 | Steele | 192/110 B X |
| 5,284,233 | 2/1994 | Feigler | 192/98 |
| 5,318,162 | 6/1994 | Maucher et al. | 192/98 X |
| 5,423,405 | 6/1995 | Fukaya | 192/110 B X |

*Primary Examiner*—Andrea L. Pitts
*Attorney, Agent, or Firm*—McKinney, Stringer & Webster, P.C.

[57] ABSTRACT

A clutch release bearing assembly with an internal bearing assembly. An internal bearing assembly is positioned on the transmission shaft of a vehicle. The internal bearing assembly is a tubular sleeve and has perforations in it for holding ball bearings. A tubular collar rides over the internal bearing assembly. A conventional clutch release bearing assembly rides over the inner collar. The conventional clutch release bearing and the inner collar slide up and down the transmission shaft on the internal bearing assembly. The internal bearing keeps the conventional bearing assembly centered on the transmission shaft and provides free movement with only minimal clearance therebetween.

32 Claims, 2 Drawing Sheets

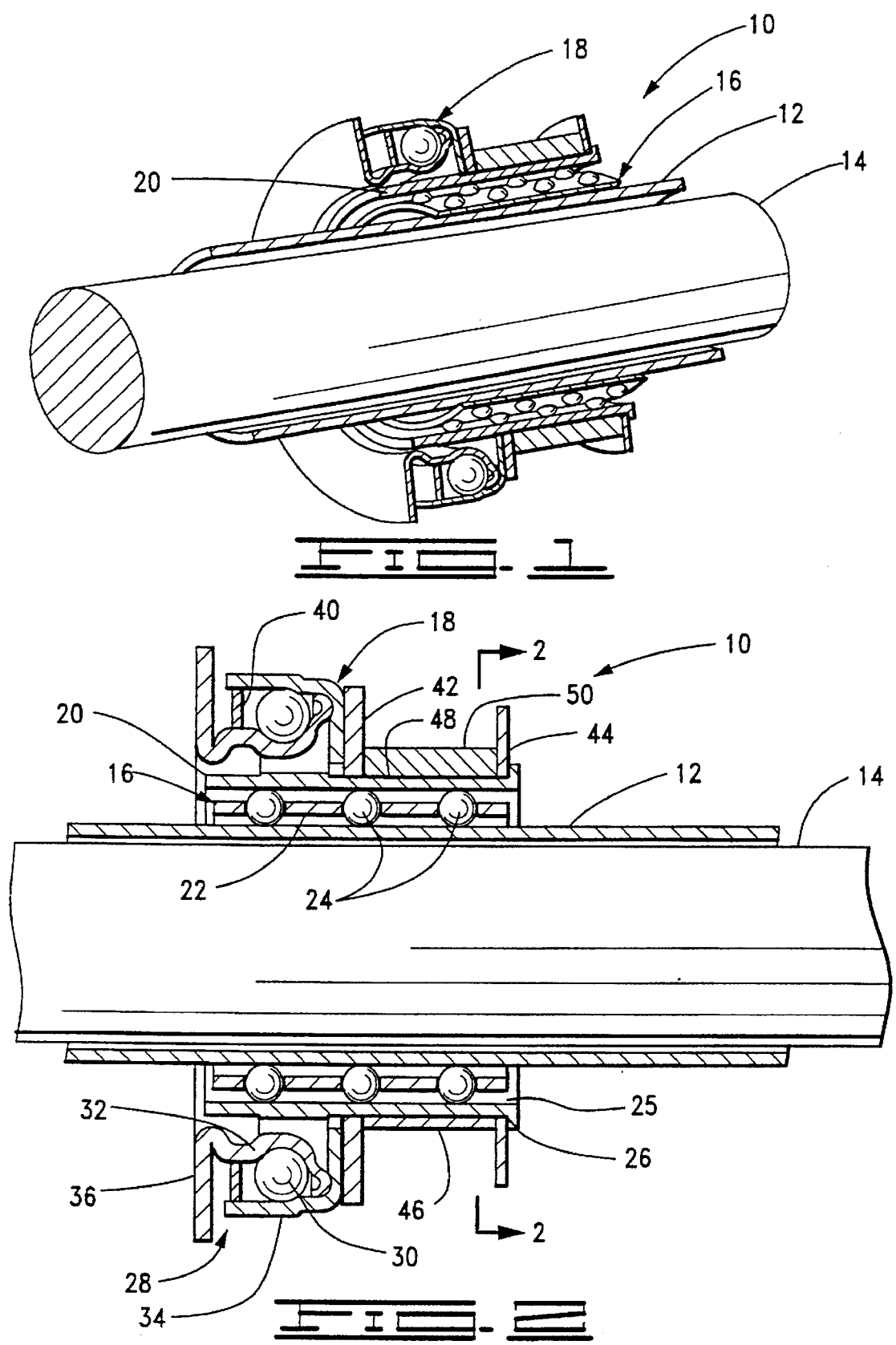

CLUTCH RELEASE BEARING ASSEMBLY

FIELD OF THE INVENTION

The present invention relates to bearing assemblies, and more particularly, to a clutch release bearing assembly used in a clutch assembly operable by a clutch release fork, the bearing assembly being operable about a transmission shaft in the drive line of a vehicle.

SUMMARY OF THE INVENTION

The present invention is directed to a clutch release bearing assembly. The clutch release bearing assembly comprises a first bearing assembly, an inner collar and a second bearing assembly.

The first bearing assembly is comprised of a tubular, perforated sleeve slidably mounted on and axially reciprocal with the transmission shaft in the drive line of a vehicle. The sleeve holds a plurality of rolling elements which are held in circumferentially spaced relation by the perforations in the sleeve of the first bearing assembly.

A tubular inner collar circumferentially and slidably engages the rolling elements in the sleeve and forms an annular space between the inner collar and the bearing assembly. The inner collar forms a radially extending flange at one end thereof.

A second bearing assembly is circumferentially supported on the inner collar. The second bearing assembly comprises a bearing, a thrust member, a clutch fork engagement member, and an anti-rotation member.

The bearing of the second bearing assembly is comprised of a plurality of rolling elements disposed between an inner race and an outer race, one of which races is adapted for rotation and has a radially extending surface for engagement with the clutch assembly. The thrust member is supported on the inner collar and is adapted for engagement with the bearing. The clutch fork engagement member is supported on the inner collar and is adapted for engagement with the clutch fork. An anti-rotation member is supported on the inner collar and is adapted to prevent rotation of the second bearing assembly.

In a second embodiment, the clutch release bearing assembly comprises a slide guide, an inner collar, a bearing, a thrust member, a clutch fork engagement member, and an anti-rotation member. The slide guide is comprised of a tubular, perforated sleeve slidably mounted on and axially reciprocal with the transmission shaft in the drive line of a vehicle. The sleeve holds a plurality of rolling elements which are held in circumferentially spaced relation by the perforations in the sleeve of the slide guide. A tubular inner collar circumferentially and slidably engages the rolling elements in the sleeve and forms an annular space between the inner collar and the slide guide. The inner collar forms a radially extending flange at one end thereof. A bearing is supported on the inner collar and comprises a plurality of rolling elements disposed between an inner race and an outer race, one of which races is adapted for rotation and has a radially extending surface for engagement with the clutch assembly. The thrust member is supported on the inner collar and is adapted for engagement with the bearing. The clutch fork engagement member is supported on the inner collar and is adapted for engagement with the clutch fork. An anti-rotation member is supported on the inner collar and is adapted to prevent rotation of the bearing.

In another embodiment of the present invention, the clutch release bearing assembly comprises a slide guide, an inner collar, a bearing, a seal, a pressure plate, a retaining plate, and an anti-rotation collar. The slide guide comprises a sleeve and rolling elements as described above. The tubular inner collar overlaps the ends of the slide guide and circumferentially and slidably engages the rolling elements of the slide guide. The bearing is supported on the inner collar and comprises a plurality of rolling elements disposed between an inner race and an outer race. As in the other embodiments, one of the races is adapted for rotatation and has a radially extending surface for engagement with the clutch assembly. A seal is positioned between the races for retaining lubricant therein. A pressure plate is supported on the inner collar and is interposed adjacent to and engages the ranged portion of the inner collar. A retaining plate is supported on the inner collar adjacent to and engages the clutch fork. An anti-rotation collar having a tubular inner surface and an ovate outer surface is supported circumferentially on the inner collar between the retaining plate and the pressure plate.

BRIEF DESCRIPTION OF THE DRAWINGS

FIG. 1 is a perspective, partly sectional view of a clutch release bearing assembly constructed in accordance with the present invention.

FIG. 2 is a side elevational view of the bearing assembly shown in FIG. 1.

DETAILED DESCRIPTION OF THE PREFERRED EMBODIMENTS

Figure 3:
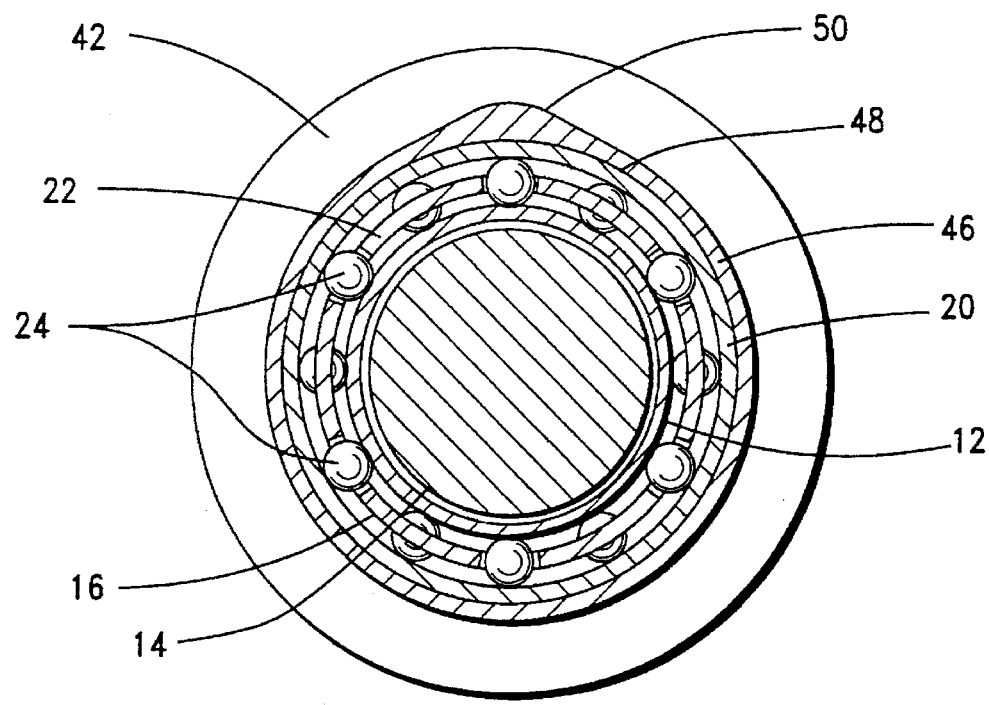
FIG. 3 is a cross-sectional view of the bearing assembly shown in FIG. 1 illustrating the assembled relationships of the elements of the bearing assembly, the section being taken along line 2—2 of FIG. 2.

The present invention relates to an improved clutch release bearing assembly and is designed for use in a clutch assembly in a vehicle. The conventional clutch assembly is attached to the flywheel through which it mechanically engages and disengages the transmission from the engine. The conventional clutch assembly generally consists of a clutch disc, a steel pressure plate with coil springs or diaphragm-release fingers or levers, such as a Belleville spring, a clutch release bearing and a clutch release fork. The clutch assembly is splined over the transmission shaft between the engine and the transmission.

The clutch release bearing slides on the transmission shaft between the clutch release fork and the pressure plate of the clutch assembly. The clutch release fork is connected to the clutch pedal. When the driver of the vehicle pushes down on the clutch pedal, the clutch release fork axially slides the clutch release bearing along the transmission shaft into contact with the release fingers of the pressure plate in the clutch assembly. Engagement of the clutch release bearing with the release levers releases pressure on the clutch disc, which is sandwiched between the flywheel and the pressure plate of the clutch assembly during engagement of the engine with the transmission, allowing the gears to shift smoothly.

Over time, misalignment of the clutch release bearing assembly with respect to the quill or transmission shaft occurs resulting in increased wear on the clutch release bearing. It is desirable to extend the useful life of the clutch release bearing by reducing misalignment. The clutch release bearing assembly of the present invention meets this objective while permitting free movement of the bearing assembly along the transmission shaft with minimal internal clearance therebetween. Additionally, the clutch release bearing of the present invention provides lubrication between the bearing assembly and the transmission shaft. These and other advantages will be apparent from the following description of the preferred embodiments.

Turning now to the drawings in general and to FIG. 1 in particular, there is shown a bearing assembly constructed in accordance with the present invention and designated generally by the reference numeral 10. In the embodiment, the bearing assembly 10 of FIG. 1 is telescoped over a quill 12 disposed coaxially around the transmission shaft 14. The bearing assembly 10 comprises a first bearing assembly 16, a second bearing assembly 18 and an inner collar 20.

As best seen in FIG. 2, the first bearing assembly 16 is comprised of a tubular, perforated sleeve 22 slidably mounted on and axially reciprocal with the quill 12 of a vehicle. The sleeve 22 can be formed of any suitable material, such as nylon, steel, brass or stainless steel.

A plurality of rolling elements 24 are held in circumferentially spaced relation by the perforations in the sleeve 22. For optimal performance, the rolling elements 24 in the first bearing assembly 16 should be the same size. It will be appreciated that the dimension of the rolling elements 24 may vary depending upon the application. However, it will be appreciated that minimal clearance between the quill 12 and the first bearing assembly 16 may be achieved by using the smallest rolling elements permissible for the particular application. Thus, use of rolling elements 24 having a smaller dimension is preferred for minimizing the internal clearance between the quill 12 and the first bearing assembly 16, thereby helping to reduce misalignment of the clutch release bearing assembly 10 with the the quill 12. The rolling elements 24 of the first bearing assembly 16 comprise a plurality of ball bearings and may be formed of any suitable material, such as steel or brass.

As illustrated in FIG. 2, the tubular inner collar 20 is disposed circumferentially about the first bearing assembly 16 and slidably engages the rolling elements 24 in the sleeve 22. Preferably, the inner collar 20 overlaps the first bearing assembly 16 at both ends thereof. Engagement of the inner collar 20 with the roller elements 24 forms an annular space 25 between the sleeve 22 and the inner collar 20. The inner collar 20 forms a radially extending flange 26 at one end thereof for a purpose which will become apparent.

The inner collar 20 serves as outer race for the first bearing assembly 16, while the quill 12 serves as an inner race. The engagement of inner collar 20 with the first bearing assembly 16 maintains the inner collar 20 in a coaxially-aligned position with respect to the quill 12. The first bearing assembly 16 also provides for free movement of the clutch release bearing assembly 10 with minimal internal clearance as it is moved axially along the quill 12.

With continuing reference to FIG. 2, the second bearing assembly 18 is circumferentially supported on the inner collar 20. The second bearing assembly is comprised of a bearing 28, a thrust member 42, a clutch fork engagement member 44, and an anti-rotation member 46.

The bearing 28 is comprised of a plurality of rolling elements 30. The dimension of the rolling elements 30 may vary depending upon the particular application. Frequently, one-eighth inch rolling elements are used. However, any size which meets the requirements of the particular application may be incorporated into the bearing assembly 10. The rolling elements 30 may be cylindrical, spherical or any shape suitable for the application and may be comprised of any suitable material, such as steel or brass. The rolling elements 10 are disposed between an inner race 32 and an outer race 34.

FIGS. 1 and 2 depict an embodiment wherein the inner race 32 of bearing 28 is adapted for rotation and forms a radially extending surface 36. The radially extending surface 36 may vary in shape. A number of other configurations, such as an arcuate radially extending surface, may be better suited for the particular application of the bearing assembly. The inner race 32 interfaces with the clutch fork. Thus, the shape of the radially extending surface 36 of the inner race 32 depends at least in part upon the type of clutch fork incorporated in the clutch assembly.

A seal 40 is positioned between the races 32 and 34 of bearing 30 for retaining lubricant therein. The seal preferably is formed of a flexible rubber composition, such as nitric or some other suitable material. The seal is affixed between the inner and outer races by bonding or some suitable method.

Referring still to FIG. 2, a thrust member is supported on the inner collar 20 and is adapted for engagement with the bearing 28. Preferably, the thrust member comprises a radially extending pressure plate 42. The radially extending pressure plate 42 is interposed adjacent to and engages in contact with the outer race 34 of the bearing 28.

A clutch fork engagement member is supported on the inner collar 20 and is adapted for engagement with the clutch fork. Preferably, the clutch fork engagement member comprises a radially extending retaining plate 44 which is interposed adjacent to and engages the flanged portion 26 of the inner collar 20. It will now be appreciated that the flanged portion 26 acts as a barrier for retaining plate 44, thereby holding the second bearing assembly 18 in operative relation.

With continuing reference to FIG. 2, an anti-rotation member is supported on the inner collar 20 and is adapted to prevent rotation of the second bearing assembly 18. Preferably, the anti-rotation member comprises an anti-rotation collar 46 which is disposed circumferentially about the inner collar 20 and is interposed between the pressure plate 42 and the retaining plate 44. The anti-rotation member engages the clutch fork thereby preventing rotation of the second bearing assembly 18.

As shown in FIG. 3, the anti-rotation collar 46 has a tubular inner surface 48, illustrated in cross-section in FIG. 3, which circumferentially and slidably engages the inner collar 20. The anti-rotation collar 46 also has an ovate outer surface 50, illustrated in cross-section in FIG. 3. The ovate outer surface 50 of anti-rotation collar 46 engages the clutch fork, thereby preventing rotation of the second bearing assembly during engagement with the clutch fork.

It will be appreciated by those skilled in the art that some clutch assemblies operate directly on a transmission shaft while others are designed to operate over a quill disposed about the transmission shaft. Accordingly, the clutch release bearing assembly 10 of the present invention may be employed to operate as previously described on a quill 12 or directly over an unsplined transmission shalt 14.

Figure 4:
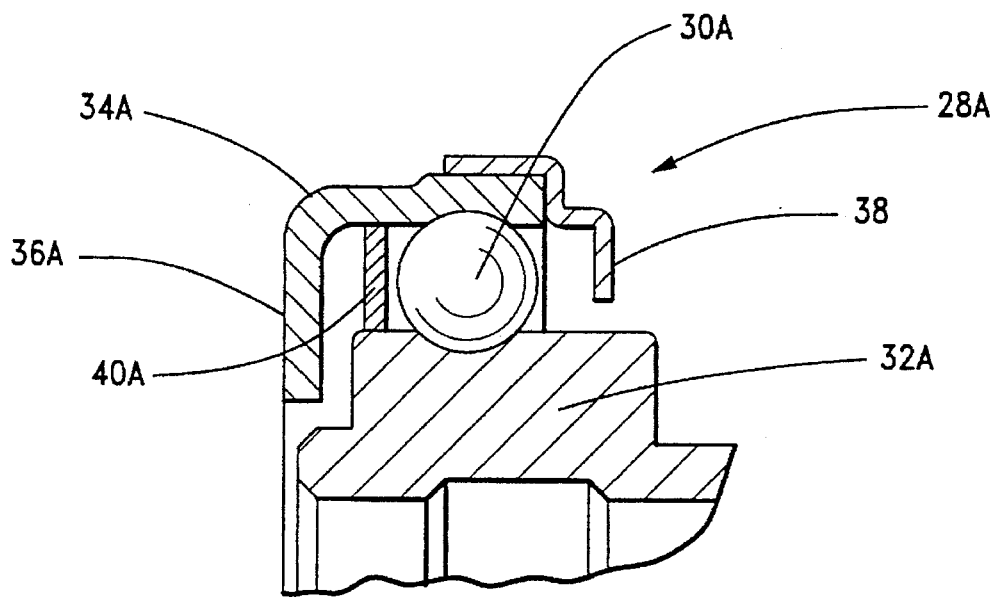
FIG. 4 is a cross-sectional view of an alternative embodiment of the bearing comprising the second bearing assembly shown in FIG. 2, wherein the outer race rotates.

Turning now to FIG. 4, an alternative embodiment of the bearing assembly 10 is illustrated. In this embodiment, the outer race 34A of the bearing 28A forms the radially extending surface 36A for engagement with the clutch assembly and is adapted for rotation. The shape of the radially extending surface 36A is adaptable according to the type of clutch fork used as described above. A closure cup 38 holds the inner race 32A and the outer race 34A in operative relationship. A seal 40A is positioned between the races 32A and 34A of the bearing 30A for retaining lubricant therein. The seal 40A is formed of comparable material and is affixed in the same fashion as described for the seal 40.

Now it will be appreciated that the bearing assembly of the present invention provides an anti-friction interface between the inner collar 20 and the transmission shaft 14 by means of a first bearing assembly or slide guide 16. At the same time, alignment of the clutch release bearing assembly 10 with respect to the transmission shaft 14 is maintained during engagement with the clutch release fork. By reducing misalignment, the life of the clutch release bearing is extended.

Changes may be made in the combination and arrangement of the various parts, elements, steps and procedures described herein without departing from the spirit and scope of the invention as defined in the following claims.

What is claimed is:

1. A clutch release bearing assembly for use in a clutch assembly operable by a clutch release fork, the bearing assembly being operable about a transmission shaft in the drive line of a vehicle, comprising:
   a first bearing assembly comprising:
      a tubular, perforated sleeve slidably mounted on and axially reciprocal with the transmission shaft; and
      a plurality of rolling elements held in circumferentially spaced relation by the perforations in the sleeve;
      a tubular inner collar circumferentially and slidably engaging the rolling elements in the sleeve and forming an annular space between the inner collar and the first bearing assembly, and wherein the inner collar has a radially extending flange at one end thereof; and
   a second bearing assembly supported on the inner collar and comprising:
      a bearing supported on the inner collar and comprising a plurality of rolling elements disposed between an inner race and an outer race, wherein one of the races is adapted for rotation and has a radially extending surface for engagement with the clutch assembly;
      a thrust member supported on the inner collar and adapted for engagement with the bearing;
      a clutch fork engagement member supported on the inner collar and adapted for operable engagement with the clutch fork; and
      an anti-rotation member supported on the inner collar and adapted to prevent rotation of the second bearing assembly.

2. The clutch release bearing assembly of claim 1 wherein the rolling elements of the first bearing assembly comprise a plurality of ball bearings.

3. The clutch release bearing assembly of claim 1 wherein a quill is disposed coaxially between the transmission shaft and the first bearing assembly for engagement with the rolling elements of the first bearing assembly.

4. The clutch release bearing assembly of claim 1 wherein the inner race of the bearing comprising the second bearing assembly rotates.

5. The clutch release bearing assembly of claim 1 wherein the second bearing assembly further comprises a closure cup which holds the inner race and the outer race of the bearing in operative relationship and wherein the outer race rotates.

6. The clutch release bearing assembly of claim 1 wherein the inner collar overlaps the first bearing assembly.

7. The clutch release bearing assembly of claim 1 wherein a lubricant-retaining seal is positioned between the inner race and the outer race of the bearing comprising the second bearing assembly.

8. The clutch release bearing assembly of claim 1 wherein the thrust member of the second bearing assembly comprises a radially extending pressure plate.

9. The clutch release bearing assembly of claim 8 wherein the pressure plate of the second bearing assembly is interposed adjacent to and engages the bearing.

10. The clutch release bearing assembly of claim 1 wherein the clutch fork engagement member of the second bearing assembly further comprises a radially extending retaining plate.

11. The clutch release bearing assembly of claim 10 wherein the retaining plate of the second bearing assembly is interposed adjacent to and engages the flanged potion of the inner collar.

12. The clutch release bearing assembly of claim 1 wherein the anti-rotation member of the second bearing assembly further comprises an anti-rotation collar having a tubular inner surface and an ovate outer surface.

13. The clutch release bearing assembly of claim 12 wherein the anti-rotation collar is disposed circumferentially about the inner collar and is interposed between the thrust member and the clutch fork engagement member.

14. A clutch release bearing assembly for use in a clutch assembly operable by a clutch release fork, the bearing assembly being operable about a transmission shaft in the drive line of a vehicle, comprising:
   a slide guide comprising:
      a tubular, perforated sleeve slidably mounted on and axially reciprocal with the transmission shaft;
      a plurality of rolling elements held in circumferentially spaced relation by the perforations in the sleeve; and
      a tubular inner collar circumferentially and slidably engaging the rolling elements in the sleeve and forming an annular space between the inner collar and the slide guide, and wherein the inner collar has a radially extending flange at one end thereof;
   a bearing supported on the inner collar and comprising a plurality of rolling elements disposed between an inner race and an outer race, wherein one of the races is adapted for rotation and has a radially extending surface for engagement with the clutch assembly;
   a thrust member supported on the inner collar and adapted for engagement with the bearing;
   a clutch fork engagement member supported on the inner collar and adapted for operable engagement with the clutch fork; and
   an anti-rotation member supported on the inner collar and adapted to prevent rotation of the bearing.

15. The clutch release bearing assembly of claim 14 wherein the rolling elements of the slide guide comprise a plurality of ball bearings.

16. The clutch release bearing assembly of claim 14 wherein a quill is disposed coaxially between the transmission shaft and the slide guide for engagement with the rolling elements of the slide guide.

17. The clutch release bearing assembly of claim 14 wherein the bearing assembly further comprises a closure cup which holds the inner race and the outer race in operative relationship and wherein the outer race rotates.

18. The clutch release bearing assembly of claim 14 wherein the inner race of the bearing rotates.

19. The clutch release bearing assembly of claim 14 wherein the inner collar overlaps the slide guide.

20. The clutch release bearing assembly of claim 14 wherein a lubricant-retaining seal is positioned between the inner race and the outer race of the bearing.

21. The clutch release bearing assembly of claim 14 wherein the thrust member comprises a radially extending pressure plate.

22. The clutch release bearing assembly of claim 21 wherein the pressure plate is interposed adjacent to and engages the bearing.

23. The clutch release bearing assembly of claim 14 wherein the clutch fork engagement member further comprises a radially extending retaining plate.

24. The clutch release bearing assembly of claim 23 wherein the retaining plate is interposed adjacent to and engages the flanged portion of the inner collar.

25. The clutch release bearing assembly of claim 14 wherein the anti-rotation member further comprises an anti-rotation collar having a tubular inner surface and an ovate outer surface.

26. The clutch release bearing assembly of claim 25 wherein the anti-rotation collar is disposed circumferentially about the inner collar and is interposed between the thrust member and the clutch fork engagement member.

27. A clutch release bearing assembly for use in a clutch assembly operable by a clutch release fork, the bearing assembly being operable about a transmission shaft in the drive line of a vehicle, comprising:

a slide guide comprising:
a tubular, perforated sleeve slidably mounted on and axially reciprocal with the transmission shaft; and
a plurality of rolling elements held in circumferentially spaced relation by the perforations in the sleeve;

a tubular inner collar overlapping and circumferentially and slidably engaging the rolling elements in the sleeve and forming an annular space between the inner collar and the slide guide, and wherein the inner collar has a radially extending flange at one end thereof;

a bearing supported on the inner collar and comprising a plurality of rolling elements disposed between an inner race and an outer race, wherein one of the races is adapted for rotation and has a radially extending surface for engagement with the clutch assembly;

a seal positioned between the inner race and the outer race of the bearing;

a radially extending pressure plate supported on the inner collar and interposed adjacent to and engaging the flanged portion of the inner collar;

a radially extending retaining plate supported on the inner collar and interposed adjacent to and engaging the clutch fork; and an anti-rotation collar having a tubular inner surface and an ovate outer surface, the anti-rotation collar being disposed circumferentially about the inner collar and between the pressure plate and the retaining plate.

28. The clutch release bearing assembly of claim 27 wherein a quill is disposed coaxially between the transmission shaft and the slide guide for engagement with the rolling elements of the slide guide.

29. The clutch release bearing assembly of claim 27 wherein the inner race of the bearing rotates.

30. The clutch release bearing assembly of claim 27 wherein the bearing further comprises a closure cup which holds the inner race and the outer race in operative relationship and wherein the outer race rotates.

31. The clutch release bearing assembly of claim 27 wherein the inner collar overlaps the slide guide.

32. The clutch release bearing of claim 27 wherein a lubricant-retaining seal is positioned between the inner race and the outer race of the bearing.

\* \* \* \* \*

UNITED STATES PATENT AND TRADEMARK OFFICE
CERTIFICATE OF CORRECTION

PATENT NO. : 5,653,323
DATED : August 5, 1997
INVENTOR(S) : Claude Rappaport

It is certified that error appears in the above-indentified patent and that said Letters Patent is hereby corrected as shown below:

Column 2, line 14, delete "ranged" and insert --flanged--

Cloumn 4, line 4, delete "10" and insert --30--

Column 4, line 19, delete "nitric" and insert --nitrile--

Cloumn 4, line 61, delete "shalt" and insert --shaft--

Column 5, line 9, delete "shalt" and insert --shaft--

Column 6, line 14, delete "potion" and insert --portion--

Column 8, line 30, after the word bearing, insert --assembly--

Signed and Sealed this

Fourteenth Day of October, 1997

BRUCE LEHMAN

*Attest:*

*Attesting Officer*        *Commissioner of Patents and Trademarks*